United States Patent [19]
Johnson

[11] Patent Number: 5,465,309
[45] Date of Patent: Nov. 7, 1995

[54] METHOD OF AND APPARATUS FOR CHARACTER RECOGNITION THROUGH RELATED SPELLING HEURISTICS

[75] Inventor: William J. Johnson, Flower Mound, Tex.

[73] Assignee: International Business Machines Corporation, Armonk, N.Y.

[21] Appl. No.: 166,200

[22] Filed: Dec. 10, 1993

[51] Int. Cl.$^6$ ...................................................... G06K 9/72
[52] U.S. Cl. ............... 382/229; 364/419.08; 364/419.12; 364/419.13; 395/700; 382/183; 382/187; 382/310
[58] Field of Search .................................. 382/40, 10, 11, 382/12, 13, 57; 364/419.13, 419.12, 419.08; 395/700

[56] References Cited

U.S. PATENT DOCUMENTS

| | | | |
|---|---|---|---|
| 3,644,898 | 2/1972 | Post | 364/419.13 |
| 4,355,302 | 10/1982 | Aldefeld et al. | 382/40 |
| 4,799,271 | 1/1989 | Nagasawa et al. | 382/40 |
| 4,991,094 | 2/1991 | Fagan et al. | 364/419.08 |
| 5,133,023 | 7/1992 | Bokser | 382/40 |
| 5,285,505 | 2/1994 | Kim et al. | 382/13 |

Primary Examiner—Leo H. Boudreau
Assistant Examiner—Anh Hong Do
Attorney, Agent, or Firm—D. A. Mims; J. E. Jobe, Jr.

[57] ABSTRACT

A method and apparatus for improving an OCR process for recognizing unidentified characters through the creation of sets of like unidentified characters in a scanned image, deducing what the unidentified characters are with a spell checking procedure and replacing only those unidentified characters which are unambiguously determined. The order for identifying characters is strategically performed so the unidentified characters which are easier to recognize are processed before those that are more difficult to recognize. As characters become identified, relationships defined by corresponding sets allow replacing the same character in related but different textual components. As characters become recognized, other characters become more recognizable by virtue of belonging to the same textual component, such as a word, or to a related textual component such as another word containing the same character.

1 Claim, 4 Drawing Sheets

METHOD OF AND APPARATUS FOR CHARACTER RECOGNITION THROUGH RELATED SPELLING HEURISTICS

FIELD OF THE INVENTION

This invention relates to optical character recognition, and more particularly, to improving character recognition through association of character candidates to related sets of spelling heuristics.

BACKGROUND OF THE INVENTION

The accuracy of an Optical Character Recognition (OCR) process' ability to recognize characters continues to improve. However, even the best OCR processes are incapable of providing one hundred per-cent accuracy. Accuracy is dependent on many factors including what fonts are being scanned and the ability to recognize the scanned fonts. One process, utilized for improving the accuracy of hand written or unfamiliar fonts, uses a training method consisting of one sample or an average of a multiplicity of character samples to create a character master for comparing scanned characters images. A probability of closeness and/or the process of elimination of other character candidates is used to select a best fit. One disadvantage of such a process is the need for retraining for a user other than the trained user. A second disadvantage revolves around the need to maintain permanent additional storage to maintain the training material.

Other processes have employed probabilistic color distribution in characters to improve the accuracy of character recognition. The use of probabilistic color distribution recognizes that certain colors are undetectable to the human eye. One problem arises when a color is misinterpreted or the OCR process is not sure of a color associated with specific characters. Other problems can result from color output variations due to a printing process such as ink changes, weather changes (temperature, humidity), print head positioning adjustment failures, etc.

Consequently, a technique is needed that provides a procedure for improving the accuracy of an OCR process by providing for the recognition of characters that would otherwise not be recognized.

SUMMARY OF THE INVENTION

This invention improves the accuracy of an OCR process and more importantly allows recognizing characters that would otherwise not be recognized. One embodiment of this invention discloses the use of a scanner to scan an image into a computer system where an OCR process is then applied to the scanned image for converting characters within the image into character codes represented within the computer system. Another embodiment utilizes a facsimile card installed in a computer system wherein received images are converted with an OCR process to character code representations within the computer system. There are various hardware configurations for using an OCR process. Any of such configurations are candidates for the present invention. First, an image, or portion therein, is scanned. An OCR process attempts recognition of characters. For example, a completed scanned page may produce a text stream with several addresses within the stream being referenced by an OCR resolution table entry. The entry contains candidates that are actual characters which may match at the time of encountering the unrecognizable character. A candidate list is associated with each character which cannot be recognized in a satisfactory manner. Members in the list of unrecognizable characters are always compared to each other to see if they are one in the same even though they are not yet recognized. Members in the list are then grouped into sets having an equivalent candidate list and then by criteria of being a matching unrecognized character. Sets are ordered from smallest candidate list to largest candidate list. This allows recognizing characters which will be easier to recognize before attempting to recognize characters more difficult to recognize. Thus, as characters become identified within a word, other less recognizable characters in the same word automatically become recognizable by virtue of word spelling. Maintaining a set which is identified as the same character, even though the character is not yet recognized, allows recognizing the character in one word so that it can be recognized in other unrelated words.

Upon ordered set completion, words associated with character candidates within a set are appropriately replaced with said candidates for comparison to a spell check dictionary. A status is associated with the spelling of a candidate word for determination of which character makes the best fit. Multiple passes are performed over the sets and each new pass on a set uses a new method of spelling status to deduce the word. The optimal conditions for spelling status are used prior to last resort types of status. Characters do not become recognized left to right in the datastream as current art would suggest. Instead, characters are recognized in an order starting with the most easily determined characters and ending with the least determinable characters. As characters become recognized in this manner, other characters become more recognizable in the same word or unrelated words. Correlations can be deduced upon completing each additional recognized character for a word or collection of words containing the same unrecognized character.

It is therefore an object of the present invention to determine unidentified characters through word spell check means.

Another object of this invention is to solve character recognition by identifying similar characteristics of characters in different words, then solving one word through spelling which will ultimately allow solving other words through look-alike occurrences of the same contained characters in otherwise unrelated words.

It is another object of the present invention to recognize a second unidentified character by first recognizing a first unidentified character which happens to be more easily identified and is in relation to said second unidentified character. Therefore as one character becomes identified, other characters become more easily identifiable.

It is a further object of this invention to recognize that a relation between a first unidentified character and a second unidentified character are substantially the same but are each not yet recognized. For example, this invention may determine that it cannot assuredly recognize a character which happens to occur in the words 'scan' and 'hat'. While the character is not recognized, this invention associates a candidate list such as 'a', 'o', 'e', 'c', 'r' and 's'. Thereafter, determining the character is 'a' in 'scan' automatically allows deducing the word 'hat' because it was determined to be the same character even though it was not yet recognized. The present invention operates independently of word positions such that both words may have been present in completely unrelated and opposite areas of the scanned image.

It is a further object of this invention to recognize that a relation between a first unidentified character and a second unidentified character belong to the same textual component such as a word. For example, as the character 'a' becomes recognized in the word 'cakes' which contains unrecognized characters 'a' and 'e', the 'e' becomes recognizable by the spelling of 'cakes'.

It is a further object of this invention to recognize that a relation between a first unidentified character and a second unidentified character belong to different textual components, such as different words, and that recognizing a first component facilitates recognizing a second component. When a first component is recognized, other unknown characters associated with the first component become known and may then be mapped to a set referencing other textual components. When replacing the same character in other components, these other components become more recognizable. For example, when the word 'cakes' became recognized, the same unrecognized 'e' character becomes replaced in other words such as 'he', thereby determining the spelling of 'he'. Without the present invention, it is likely that 'he' would be incorrectly interpreted as 'hi', 'ho' or 'ha'.

It is a further object of this invention to recognize that a relation in a first unidentified character belongs to a textual component that contains another unidentified character which also becomes recognized upon recognition of the textual component, and that another unidentified character, upon associated set replacement in a different textual component, allows identifying the different textual component.

It is an object of this invention to improve character recognition through grouping substantially unidentifiable characters into similar sets, wherein a set defines a relationship between a substantially unidentifiable characters, the relationship allowing the recognition of the same character and other unidentified characters in the same or different textual components.

It is an object of the present invention to group unidentified characters similar in appearance into the same set to facilitate recognizing textual components for which the unidentified characters are members.

It is an object of the present invention to group unidentified characters containing the same candidate list into the same set to facilitate recognizing textual components for which unidentified characters are members.

It is an object of the present invention to order sets such that more easily identifiable characters are recognized prior to unidentified characters which are more difficult to recognize.

As characters/words become recognized, relationships between the newly recognized characters/words and other characters/words allow an easier recognition of subsequently recognized characters/words.

It is an object of the present invention to perform multiple passes over unknown characters in an order dictated by an optimal method for recognizing characters rather than a method dictated by the syntax of the data such as a left to right order.

It is yet another object of this invention to start with an optimal spelling status on initial iterative passes and ending with last resort types of spelling status on final iterative passes. Obvious characters become recognized before unobvious characters. Utilizing sets of like characters allows identifying some unobvious characters. As characters become recognized within textual components such as words, other characters become recognizable. An entire image is elaborated in an optimal recognition order.

It another object of this invention to correctly solve words when more than one character renders a correctly spelled word.

It is another object of this invention to correctly solve words when a context is not definitive for solving a word spelling.

It is an object of this invention to be coupled to or integrated with other character recognition means so that the best possible recognition is performed.

DETAILED DESCRIPTION

Figure 1:
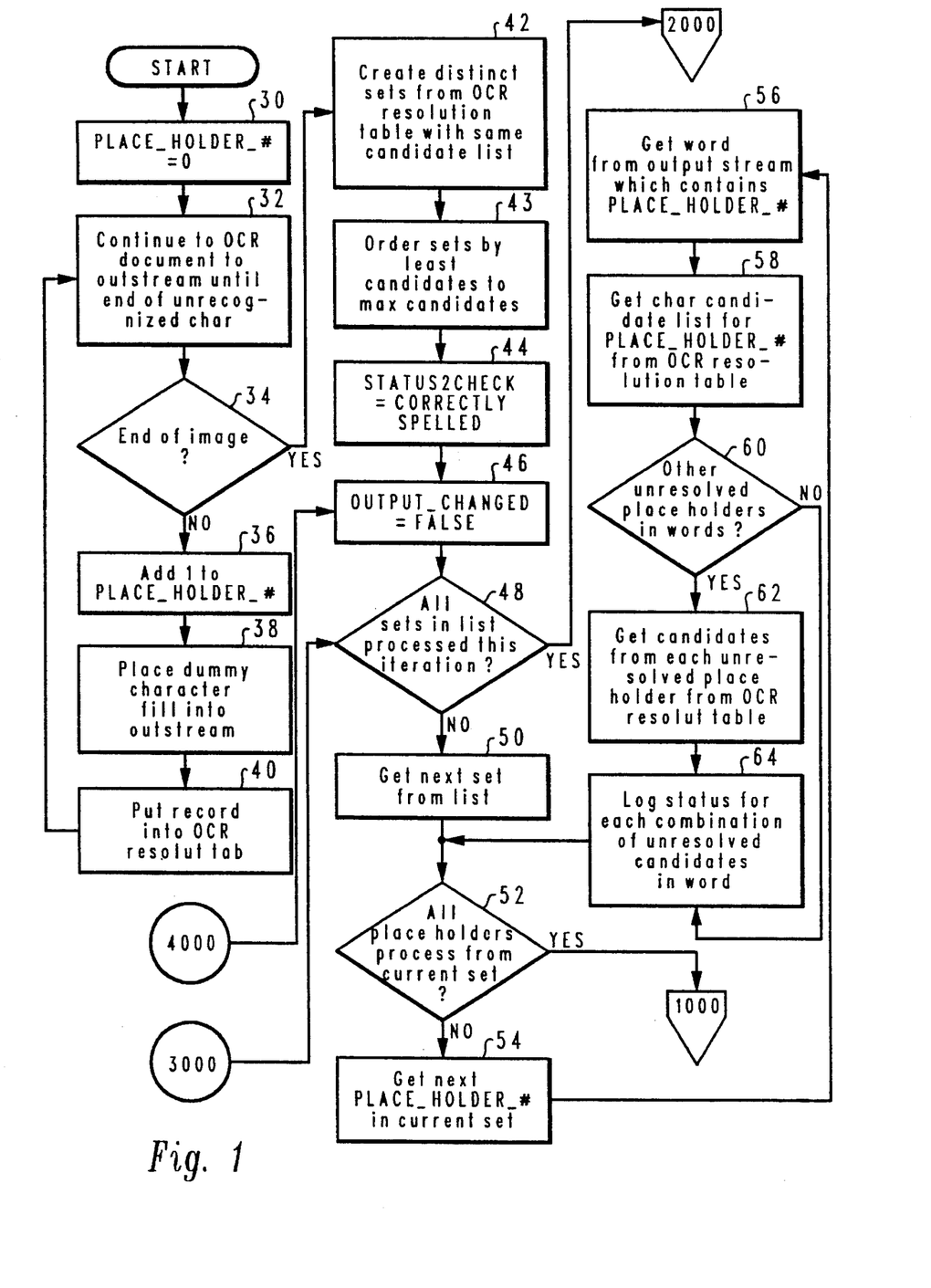
FIG. 1 depicts a flowchart demonstrating the processing of the present invention.

With reference to the figures, and in particular FIG. 1, the flow diagram for the present invention processing is shown. A document image, or subset portion thereof, is scanned using conventional techniques well known to those skilled in the art. Output from the conventional scanning technique provides the base set of data used by subsequent deduction processes to recognize characters which are unrecognizable.

In block 30, the present invention process starts and initializes a $PLACE_{13}HOLDER_{13}\#$ variable to zero. This variable facilitates maintaining an appropriate marker for all character positions of an output text stream which are not recognizable. Conventional scanning of the image is permitted in block 32 until either the end of the image is encountered or another unrecognized character is found. This conventional scanning includes producing an output text stream of all recognized characters in the appropriate order up until a character is determined to be in question/unidentified. At that point, blocks 34, 36, 38 and 40, hereinafter discussed, process the unrecognized/unidentified character by managing a marker to the appropriate position of the unidentified character in the output stream. After the unrecognized characters are processed by the present invention, control returns to block 32 where conventional scanning and output stream processing continues production of the appropriate output text stream positions. At block 34, the procedure checks to see if the end of the image has been reached. If the end of the image has not been reached, this indicates that another unrecognized character has been found. At block 36, the $PLACE_{13}HOLDER_{13}\#$ variable is incremented by one to ensure marker uniqueness for each unrecognized character. Processing continues to block 38 where a dummy character is placed into the output stream. This character utilizes the same storage required by a valid character in the output stream and will be replaced by the best fit character determined in subsequent processes. At block 40, a record is inserted into an OCR Resolution Table. The record in the OCR Resolution Table consists of 3 fields:

Field 1: $PLACE_{13}HOLDER_{13}\#$

Field 2: Output Text Stream Character Position

Field 3: Prioritized list of candidate characters (most likely character to least likely character)

After processing is completed at block 40, controls returns to block 32. Thus, blocks 32 through 40 process an entire image such that the OCR Resolution Table will contain a record for every unidentifiable character. If in block 34, the end of the image is detected, then processing proceeds to block 42. To further demonstrate the processing of blocks 32 through 40, a resulting output stream example is shown. The example represents a fine-tuned character match tolerance for block 32 which causes a substantial amount of uncertainty, but identifies all characters which were recognized with 100% accuracy. One skilled in the art will appreciate that the near-exact matching constraints in block 32 tends to cause a larger number of characters to be unidentifiable with certainty, while correctly identifying the characters which are identified. One skilled in the art will also appreciate that less exact constraints in block 32 causes less characters to be undetermined but tends to incorrectly determine some of the characters.

The example will now be presented wherein a number of indistinguishable characters are written in an output stream. Characters which were determined to be indistinguishable are:

1). 'm', 'n', 'y', 'u' and 'v'
2). 'g', 'j', 'q' and 'y'
3). 'a' and 'c'
4). 'f' and 't'

EXAMPLE OUTPUT STREAM

Dear Sir(s),

I a^1 unhappy with the lon^2 wait ^ 3^4 ^5amil^6 has had to endure concernin^7 the hurricane insurance claim ^8iled to you. We've been living in tents for the last month and still h^9ve no indication being helped with our claim. My e^10ployer just . . .

An actual output stream would contain only a single non-printable character such as the hex value 00 for a dummied character. The '^N' notation is only used in the example above for easier reader association of the unidentifiable characters to corresponding OCR Resolution Table records. The following is the produced OCR Resolution Table.

EXAMPLE OF OCR RESOLUTION TABLE ENTRIES;

| Place Holder # | Character Position | Candidate List |
|---|---|---|
| 1 | Buffer Byte Offset 58 | 'm', 'n', 'y', 'u' and 'v' |
| 2 | Buffer Byte Offset 80 | 'g', 'j', 'g' or 'y' |
| 3 | Buffer Byte Offset 87 | 'm', 'n', 'y', 'u' and 'v' |
| 4 | Buffer Byte Offset 88 | 'g', 'j', 'q' or 'y' |
| 5 | Buffer Byte Offset 91 | 't' and 'f' |
| 6 | Buffer Byte Offset 96 | 'g', 'j', 'q' or 'y' |
| 7 | Buffer Byte Offset 125 | 'g', 'j', 'q' or 'y' |
| 8 | Buffer Byte Offset 158 | 't' and 'f' |
| 9 | Buffer Byte Offset 231 | 'a' and 'c' |
| 10 | Buffer Byte Offset 284 | 'm', 'n', 'y', 'u' and 'v' |

Returning again to block 42, the base information illustrated in the above resolution table, is used in subsequent processing to determine the correct characters. The output stream simply contains dummied characters which will be subsequently replaced. It is important to note that the processing described by the blocks proceeding block 42, may be utilized in conjunction with various current recognition improvement techniques. When characters are not recognized satisfactorily, blocks 42 and the following blocks may be employed. Integrating the present invention with current OCR techniques will also enhance the accuracy of the OCR resolution table.

Referring again to block 42, Character Match (CM) Sets are created from the OCR Resolution Table. Each set contains records from the OCR Resolution Table which have equivalent candidate lists and which are identified to be substantially the same character. CM Sets created for the example as the result of block 42 are:

| Sets defined by Place Holder # List |
|---|
| 1, 3, 10 |
| 2, 7 |
| 4, 6 |
| 5, 8 |
| 9 |

Note that despite 2, 4, 6 and 7 having the same candidate list, block 42 compares the underlying characters and finds they are substantially different. The same OCR comparison techniques existing in the current art is utilized to make this decision.

Processing then continues to block 43, from block 42, where the list of sets are sorted from smallest candidate list to largest candidate list. This permits recognizing the simple challenges before the difficult ones. It will be shown that recognizing the simple cases first, makes recognizing the more difficult cases easier. Block 43 then produces the following priority process ordered list:

| Ordered Set List |
|---|
| 1) 5, 8 |
| 2) 9 |
| 3) 2 and 7 |
| 4) 4 and 6 |
| 5) 1, 3 and 10 |

If multiple sets contain the same number of candidates, then the sets are ordered by maximum number of references to least number of references within the ordered candidate list count position, as shown by set 1 and set 2. If multiple sets, with the same number of candidates, contain the same number of references, then the maximum length word of any reference in a set takes priority over the set with a less referenced maximum length word. This is shown by sets 3 and 4. If sets with the same number of references contain the same maximum length, then various embodiments will select various priorities, including a random priority, without departing from the spirit and scope of the present invention.

From block 43, processing proceeds to block 44 which initializes a STATUS2CHECK variable to CORRECTLY SPELLED. The STATUS2CHECK variable is used for processing each pass on the CM Sets. Status refers to the return status from a spell checker dictionary/textual component dictionary such as that found in an editor product. The first pass determines the correct characters by the maximum correctly spelled words for a set. When the first pass has replaced determined characters into the associated words, other passes are performed to continue determining other characters. When a pass has determined no characters, the next meaningful status is used to determine unidentifiable characters. In this fashion, multiple passes with the same status elaborate characters. Subsequent multiple pass processing with other status continue to determine characters not identified by previous multiple pass processing. From block 44, control proceeds to block 46 which initializes an OUTPUT$_{13}$CHANGED variable to FALSE. Block 46 defines the top of an iterative loop for processing multiple passes on the current CM Set list. Multiple passes on CM sets are performed until no characters are determined by a pass. Then, block 48 checks if all sets have been processed. If this is the first execution of block 48 and all characters were recognized by block 32 (i.e. no CM set list as the result of blocks 42 and 43), block 48 passes to block 80 in FIG. 2, on to block 82, and then on to block 84 where the completed output stream is provided to the underlying application. If in block 48, one or more sets exist, then none of the sets are yet processed and processing continues to block 50.

For subsequent iterations of block 48, block 48 defines the top of an iterative loop for processing each set in the current list of CM Sets. If all sets are not yet processed within the execution iteration started at block 46, then block 48 proceeds to block 50. Block 50 retrieves the next set from the list of CM Sets. Then, block 52 checks if all place holder references have been processed from the current set. Block 52 defines the top of an iterative loop for processing every place holder reference within a particular set. If in block 52, all place holder references have not been processed from the current set, then block 54 retrieves the next place holder reference and continues to block 56 where the associated textual component (i.e. word) is retrieved from the output stream. The associated word is retrieved by using the Character Position field from the corresponding record in the OCR Resolution Table. Then, block 58 retrieves the candidate list from the same corresponding record in the OCR Resolution Table. Block 58 flows to block 60 where a check is made for other unresolved place holders within the word candidate lists of the current word and status is appropriately tabulated. If, in block 60, there are no other unresolved characters in the word, then processing continues directly to block 64. It will be shown, in following examples, that the word may have already been determined by previous passes, in which case the singular status will be logged in block 64.

The current word may contain one or more unknown characters, each of which may be denoted as 'SET i: Character[j,k]' such that i is the SET for which the character belongs to, j is the current place holder number within the set and k is the current character to try from the candidate list associated with the place holder. With reference now to the above example, upon the first execution of block 64, the following status is tabulated when using, for example, a WordPerfect (TM) 5.0 spell check algorithm. One skilled in the art recognizes that any spell dictionary may be used, and preferably it is one that maximizes words found in the particular document type being scanned.

|  |  |  | WORD | STATUS |
|---|---|---|---|---|
| SET 1 : Char[5,f] | => | with g in #6 | familg | 1 hit |
|  |  | with j in #6 | familj | 1 hit |
|  |  | with q in #6 | familq | 1 hit |
|  |  | with y in #6 | family | CORRECTLY SPELLED |
| SET 1 : Char[5,t] | => | with g in #6 | tamilg | 3 hits |
|  |  | with j in #6 | tamilj | 2 hits |
|  |  | with q in #6 | tamilq | 2 hits |
|  |  | with y in #6 | tamily | 8 hits |

Block 64 flows to block 52 for processing the next place holder member in the currently processed set. If in block 52, all place holders have been processed from the current set, processing continues to FIG. 2 block 66. With reference now to the above example, status tabulation which would have occurred upon first execution of block 66 in FIG. 2 would be:

|  |  |  | WORD | STATUS |
|---|---|---|---|---|
| SET 1 : Char[5,f] | => | with g in #6 | familg | 1 hit |
|  |  | with j in #6 | familj | 1 hit |
|  |  | with q in #6 | familq | 1 hit |
|  |  | with y in #6 | family | CORRECTLY SPELLED |
| SET 1 : Char(5,t) | => | with g in #6 | tamilg | 3 hits |
|  |  | with j in #6 | tamilj | 2 hits |
|  |  | with q in #6 | tamilq | 2 hits |
|  |  | with y in #6 | tamily | 8 hits |
| SET 1 : Char[8,f] | => | with f in #6 | filed | CORRECTLY SPELLED |
| SET 1 : Char[8,t] | => | with t in #6 | tiled | CORRECTLY SPELLED | retrieved from the output stream. When a word is retrieved from the output stream, the special 0 valued character space is sought by block 60. Previous passes on this word may have already identified the character and replaced it in the output stream, thereby overwriting the special zeroed placeholder. Thus, block 60 only looks for unresolved (i.e. presence of 0 indicators) characters in the word. If in block 60, other unresolved place holders exist in the current word, then the corresponding OCR Resolution Table records are retrieved in block 62 for each associated unresolved character candidate list. Block 62 then continues to block 64 where every combination of characters is tried from all It should be noted that in block 62, execution was not necessary for place holder number 8 of SET 1 because there were no other unrecognized characters in the associated textual component.

Figure 2:
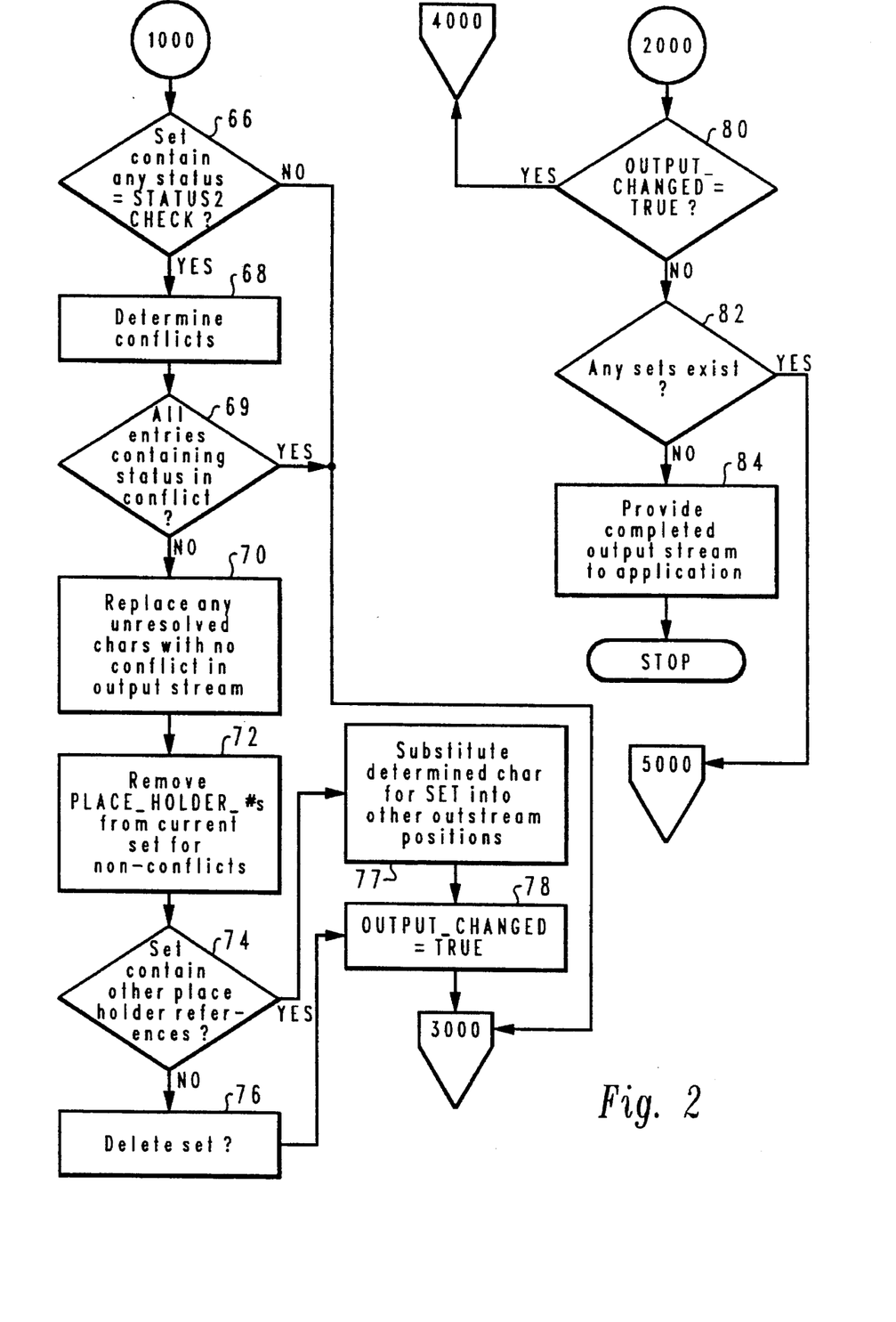
FIGS. 2 and 3 depict flowcharts extending from the FIG. 1 flow chart.

Referring now to FIG. 2, block 66 checks if any words contain the status indicated by the variable STATUS2CHECK. The first execution of block 66 implies the STATUS2CHECK variable is set to CORRECTLY SPELLED. Examination of tabulated status shows three words determined to be correctly spelled within the set. If in block 66, one or more entries have the sought status, then processing continues to block 68 for a conflict validation. A conflict would result if more than one word within a placeholder trial contains the same status while using a different character. Then, block 69 validates if all placeholders for the set are in conflict. If they are, then processing continues back to FIG. 1 (block 48) for the next set in the list. If there is one or more placeholders not in conflict, then processing continues to block 70. In the example, the word 'family' is the only correctly spelled word within placeholder 5. However, there are two correctly spelled words within placeholder 8. Placeholder 8 is a conflict and is marked as such. Block 69 flows to block 70 where unresolved characters of non-conflicting words with the sought status are placed into the output stream. In the example, the word 'family' is produced in the output stream. No direct action is performed on placeholder 8 because there was a conflict. Block 70 flows to block 72 where placeholder 5 is removed from SET 1 because it is resolved. It should be noted that the character 'y' in family was indirectly processed and makes subsequent processing of SET 3 easier. Block 74 then checks for any other placeholders contained in the set. If there were no other placeholders, then the set is deleted in block 76 and processing flows to block 78. If, in block 74 other unresolved placeholders still exist, then block 77 is processed. In the example, the first execution of block 74 determines that placeholder 8 still exists, therefore processing continues to block 77. Block 77 then replaces the determined character of the current set in the other placeholder references. In the example, the character 'f' is placed in the output at placeholder's 8 referenced character position. It should be noted that if the word contained other unidentified characters up to this point, the other characters would be more easily determined now that the 'f' character was replaced into one of the unknown positions of the word. Block 78 then sets the OUTPUT$_{13}$CHANGED variable to TRUE thereby indicating one or more changes were made to the output stream.

The output stream of the example now looks like:
Dear Sir(s),
    I a^1 unhappy with the lon^2 wait ^3^4 family has had to endure concernin^7 the hurricane insurance claim filed to you. We've been living in tents for the last month and still h^9ve no indication of being helped with our claim. My e^10ployer just . . .
With the first set processed, the ordered set list now looks like:

| Ordered Set List |
|---|
| 1) 8 |
| 2) 9 |
| 3) 2 and 7 |
| 4) 4 and 6 |
| 5) 1, 3 and 10 |

Block 78 then returns to block 48 of FIG. 1. Referring now back to FIG. 1, block 48 starts the processing iteration for the next set as previously described. During the second set processing, the first encounter of block 66 in FIG. 2 would produce the following status conditions as described above.

|  |  |  | WORD | STATUS |
|---|---|---|---|---|
| SET 2 : | Char[9,a] => | with a in #9 | have | CORRECTLY SPELLED |
|  | Char[9,c] => | with c in #9 | hcve | 3 hits |

Starting at block 48 for set 2, blocks 50, 52, 54, 56, 58, 60, 64, 52, 66, 68, 69, 70, 72, 74, 76 and 78 are processed respectively as previously described. Block 78 then returns back to FIG. 1 block 48 for another iteration on the set list. No conflicts existed within set 2 and the output stream is replaced with the character 'a' to form the word 'have'. Placeholder 9 was the only placeholder for set 2, therefore block 76 deleted the set from the current set list.

The output stream of the example now looks like:
Dear Sir(s),
    I a^1 unhappy with the lon^2 wait ^3^4 family has had to endure concernin^7 the hurricane insurance claim filed to you. We've been living in tents for the last month and still have no indication of being helped with our claim. My e^10ployer just . . .
With the second set processed, the ordered set list now looks like:

| Ordered Set List |
|---|
| 1) 8 |
| 3) 2 and 7 |
| 4) 4 and 6 |
| 5) 1, 3 and 10 |

With reference to FIG. 1, block 48, another set is found in the current list, namely set 3. Processing proceeds to block 50 where set 3 is retrieved from the list. Processing then continues through blocks 52, 54, 56, 58, 60 and 64, respectively for placeholder 2. Processing continues through blocks 52, 54, 56, 58, 60 and 64, respectively for placeholder 7. Processing then continues to block 66 of FIG. 2, through block 52. With reference now to FIG. 2 block 66, upon encounter of block 66, the following status would be logged:

|  |  |  | WORD | STATUS |
|---|---|---|---|---|
| SET 3 : Char[2,g] | => | with a in #1 | long | CORRECTLY SPELLED |
| SET 3 : Char[2,j] | => | with a in #1 | lonj | 12 hits |
| SET 3 : Char[2,q] | => | with a in #1 | lonq | 10 hits |
| SET 3 : Char[2,y] | => | with a in #1 | lony | 30 hits |
| SET 3 : Char[7,g] | => |  | concerning | CORRECTLY SPELLED |
| SET 3 : Char[7,j] | => |  | concerninj | 2 hits |
| SET 3 : Char[7,q] | => |  | concerninq | 2 hits |
| SET 3 : Char[7,y] | => |  | concerniny | 2 hits |

Block 66 proceeds to block 68 for conflict determination. Block 69 then checks for all entries in conflict. The fact that either placeholder contained no conflict means processing moves to block 70. Block 70 replaces 'g' in the output stream for both placeholders. Block 72 removed the placeholders from the set. Block 74 determines the set does not contain other placeholders and therefore deletes set 3 in block 76. Block 78 then sets the indicator for the output stream being changed. At this point, the output stream looks like:

Dear Sir(s),
 I a^1 unhappy with the long wait ^3^4 family has had to endure concerning the hurricane insurance claim filed to you. We've been living in tents for the last month and still have no indication of being helped with our claim. My e^10ployer just . . .
With the third set processed, the ordered set list now looks like:

| Ordered Set List |
|---|
| 1) 8 |
| 4) 4 and 6 |
| 5) 1, 3 and 10 |

With reference now back to FIG. 1, block 48, another set is found in the current list, namely set 4. Processing proceeds to block 50 where set 4 is retrieved from the list. Processing then continues through blocks 52, 54, 56, 58, 60, 62 and 64, respectively for placeholder 4. Processing continues through blocks 52, 54, 56, 58, 60 and 64, respectively for placeholder 6. Note that in block 64 for placeholder 6, there are no unresolved characters because placeholder 6 was resolved by an earlier pass. With reference now to FIG. 2 block 66, upon encounter of block 66, the following status would be logged (# implies some number greater than or equal to 1):

|  |  |  | WORD | STATUS |
|---|---|---|---|---|
| SET 4 : Char[4,g] | => | with m in #3 | mg | CORRECTLY SPELLED |
|  |  | with n in #3 | ng | # hits |
|  |  | with w in #3 | yg | # hits |
|  |  | with u in #3 | ug | # hits |
|  |  | with v in #3 | vg | # hits |
| SET 4 : Char[4,j] | => | with m in #3 | mj | # hits |
|  |  | with n in #3 | nj | # hits |
|  |  | with w in #3 | yj | # hits |
|  |  | with u in #3 | uj | # hits |
|  |  | with v in #3 | vj | # hits |
| SET 4 : Char[4,q] | => | with m in #3 | mq | # hits |
|  |  | with n in #3 | nq | # hits |
|  |  | with w in #3 | yq | # hits |
|  |  | with u in #3 | uq | # hits |
|  |  | with v in #3 | vq | # hits |
| SET 4 : Char[4,y] | => | with m in #3 | my | CORRECTLY SPELLED |
|  |  | with n in #3 | ny | CORRECTLY SPELLED |
|  |  | with w in #3 | yy | # hits |
|  |  | with u in #3 | uy | # hits |
|  |  | with v in #3 | vy | # hits |
| SET 4 : Char[6,R] | => | all resolved | family | CORRECTLY SPELLED |

Block 66 would proceed to block 68 where there is a placeholder with no conflicts, namely placeholder 6. In fact, it contained no unresolved characters at all. Block 69 then flows to block 70 where there are no unresolved characters. Block 72 removes placeholder 6 from the set. Then, block 72 flows to block 77 through block 74 where the 'y' character is substituted into placeholder 4. Block 78 then flows back to FIG. 1 block 48 as previously described. At this point, the output stream looks like:

Dear Sir(s),
 I a^1 unhappy with the long wait ^3y family has had to endure concerning the hurricane insurance claim filed to you. We've been living in tents for the last month and still have no indication of being helped with our claim. My e^10ployer just . . .
With set 4 processed the Ordered set list now looks like:

| Ordered Set List |
|---|
| 1) 8 |

| Ordered Set List |
|---|
| 4) 4 |
| 5) 1, 3 and 10 |

With reference now back to FIG. 1 block 48, another set is found in the current list, namely set 5. Processing proceeds to block 50 where set 5 is retrieved from the list. Processing then continues through blocks 52, 54, 56, 58, 60 and 64, respectively for placeholder 1. Processing continues through blocks 52, 54, 56, 58, 60 and 64, respectively for placeholder 3. Processing then continues through blocks 52, 54, 56, 58, 60 and 64, respectively for placeholder 10. Note that in block 64 during placeholder 3 processing, there is a character which was resolved from a previous pass. Referring now back to FIG. 2 block 66, upon encounter of block 66, the following status would be logged:

|  |  | WORD | STATUS |
|---|---|---|---|
| SET 5 : Char[1,m] | => | am | CORRECTLY SPELLED |
| SET 5 : Char[1,n] | => | an | CORRECTLY SPELLED |
| SET 5 : Char[1,y] | => | ay | 53 hits |
| SET 5 : Char[1,u] | => | au | CORRECTLY SPELLED |
| SET 5 : Char[1,v] | => | av | 27 hits |
| SET 5 : Char[3,m] | => | my | CORRECTLY SPELLED |
| SET 5 : Char[3,n] | => | ny | CORRECTLY SPELLED |
| SET 5 : Char[3,y] | => | yy | 38 hits |
| SET 5 : Char[3,u] | => | uy | 42 hits |
| SET 5 : Char[3,v] | => | vy | 15 hits |
| SET 5 : Char[10,m] | => | employer | CORRECTLY SPELLED |
| SET 5 : Char[10,n] | => | enployer | 1 hits |
| SET 5 : Char[10,y] | => | eyployer | 2 hits |
| SET 5 : Char[10,u] | => | euployer | 2 hits |
| SET 5 : Char[10,v] | => | evployer | 1 hits |

From block 66, processing proceeds to block 68 where all placeholders except placeholder 10 are found to be conflict. Block 69 then flows to block 70. Block 70 replaces 'm' in the output stream for placeholder 10. Block 72 removes placeholder 10 from the set. Block 74 determines the set contains other placeholders and therefore block 74 flows to block 77. Block 77 substitutes the 'm' character for placeholder 3 and placeholder 4. Block 78 then sets the indicator for the output stream being changed. At this point, the output stream looks like:
Dear Sir(s),
I am unhappy with the long wait my family has had to endure concerning the hurricane insurance claim filed to you. We've been living in tents for the last month and still have no indication of being helped with our claim. My employer just . . .
With the last set in the list processed, the ordered set list now looks like:

| Ordered Set List |
|---|
| 1) 8 |
| 4) 4 and 6 |

| Ordered Set List |
|---|
| 5) 1 and 3 |

One skilled in the art will appreciate that the word 'my' never would have been successfully recognized if the word 'family' had not been recognized first. The word 'my' may have been interpreted to be 'me', 'ma', etc. by current art processes. The word 'my' may have been interpreted to be 'mg' by the present invention if the sets are not ordered properly.

Block 78 proceeds back to block 48 in FIG. 1 which then determines if all the sets in the current list have been processed. Block 80 in FIG. 2 then executes. The $OUTPUT_{13}CHANGED$ flag is set to true because one or more characters were replaced in the output stream during the list iteration. Block 80 proceeds to block 46 in FIG. 1 where the current list is again processed. Blocks 46 through block 80 will continue to be executed as previously described until no output is processed to the output stream and the $OUTPUT_{13}CHANGED$ flag remains FALSE. After the second pass on the current list, the ordered list will have been reduced to an empty list.

The $OUTPUT_{13}CHANGED$ flag remains true for one more pass on the current list. Upon completion of the third pass, at block 80, if the $OUTPUT_{13}CHANGED$ flag is not TRUE, then block 82 determines if there are any sets remaining for processing. If there are no more sets, then block 84 passes the successfully completed output stream to the underlying application and processing completes. If one or more sets do exist, then processing continues to block 86 in FIG. 3. With reference now to block 86 in FIG. 3, if STATUS2CHECK equals $CORRECTLY_{13}SPELLED$, then the STATUS2CHECK variable is set to a new status (i.e. $1_{13}HIT$) and all remaining sets in the list are reprocessed as heretofore described. There may be cases where the OCR process in block 32 did not provide the correct character in the candidate list. A case may also exist where the unrecognized character is a typo. The present invention deals with such a problem by reprocessing sets with a lesser but desirable status to check for when performing spell checks. This allows identifying characters in textual components even when the OCR resolution table candidates are incorrect for one reason or another. If, in block 86, the STATUS2CHECK variable is already set to 1 HIT, then processing continues to block 88. It is very important to note that many status types may be implemented in FIG. 3 such that a current list processed until $OUTPUT_{13}CHANGED$ remains FALSE may be reprocessed with many types of status. $CORRECTLY_{13}SPELLED$ and 1 HIT are the most desirable examples and are therefore shown. Many varying descending levels of status may be implemented without departing from the spirit and scope of the invention. Should one or more sets still not be successfully processed, then the present invention relies on alternative techniques to make a final judgement. In the example, if placeholder 10 did not exist in SET 5, then SET 5 could not have been reduced because either 'n' or 'm' would work for a correctly spelled word. Assuming no existence of placeholder 10, block 88 would flow to block 100 which would retrieve SET 5 placeholder 1. Block 102 would then select the first candidate in the candidate list because it was the most confident character (priority order). Block 104 would then update the output stream correspondingly and processing would continue back to block 88 for the next unresolved placeholder.

Figure 3:
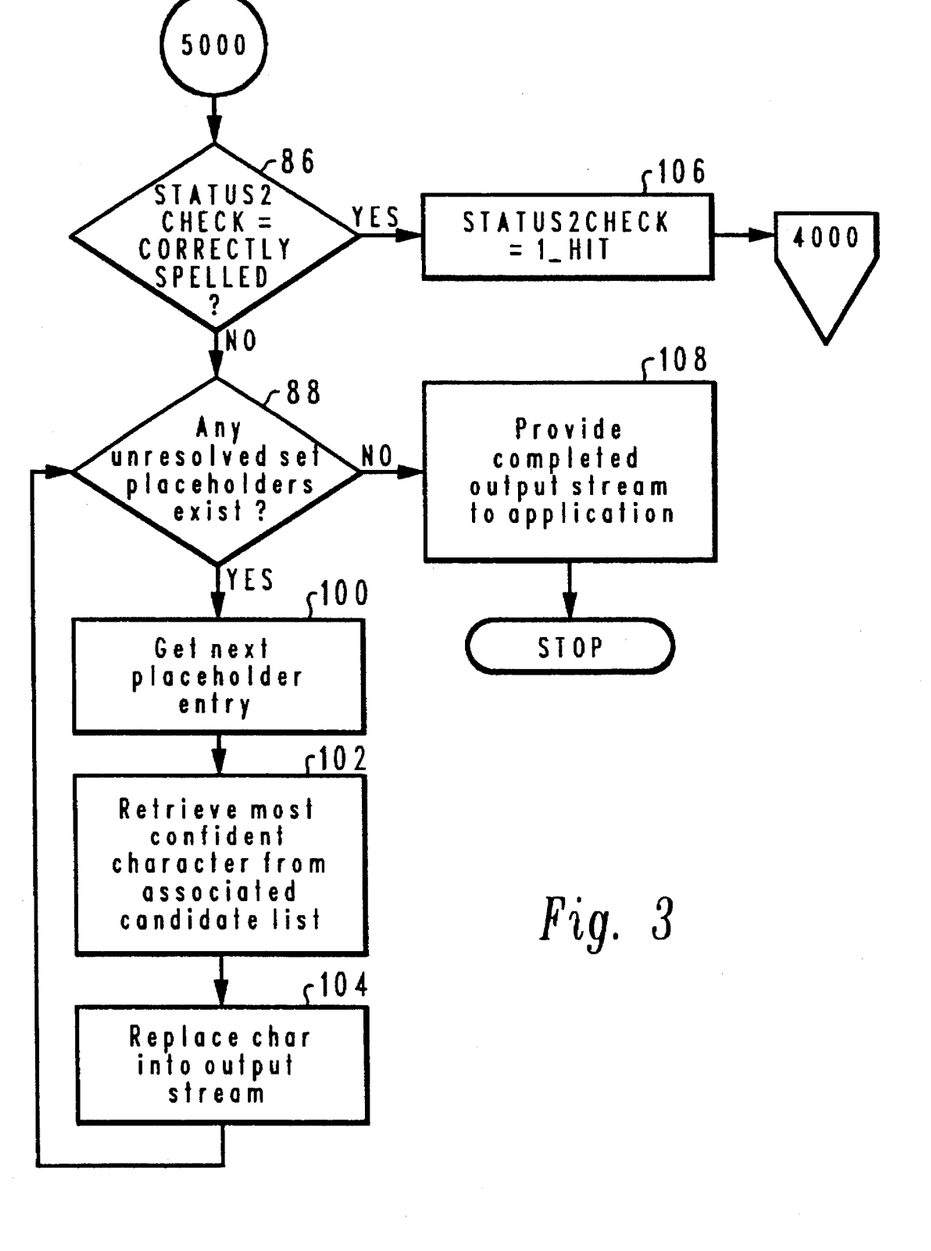

If in block 88, all remaining placeholders were processed, then block 108 would provide the output stream to the underlying application and processing would stop.

It is important to note that actual processing of a scanned image may produce many placeholders within a set, thereby making character resolution more accurate. One skilled in the art will appreciate that the examples above were simple and merely served to explain processing. More uncertainty of a character during an OCR process simply provides a larger candidate list which is processed. It should be noted that grouping placeholders within sets allows identifying which characters are the same but are not yet recognized. Having this relationship facilitates recognizing words containing the same character which was recognized in other words. Simply having the relationship of belonging to the same word allows recognizing characters of words wherein other characters in the same word are recognized.

The OCR resolution table may also contain references to characters which are already resolved by block 32. This allows grouping characters having similar candidates with known characters in order to provide a lead in resolving unknown characters. Blocks 60, 62 and 64 operate independently of characters already resolved.

Figure 4:
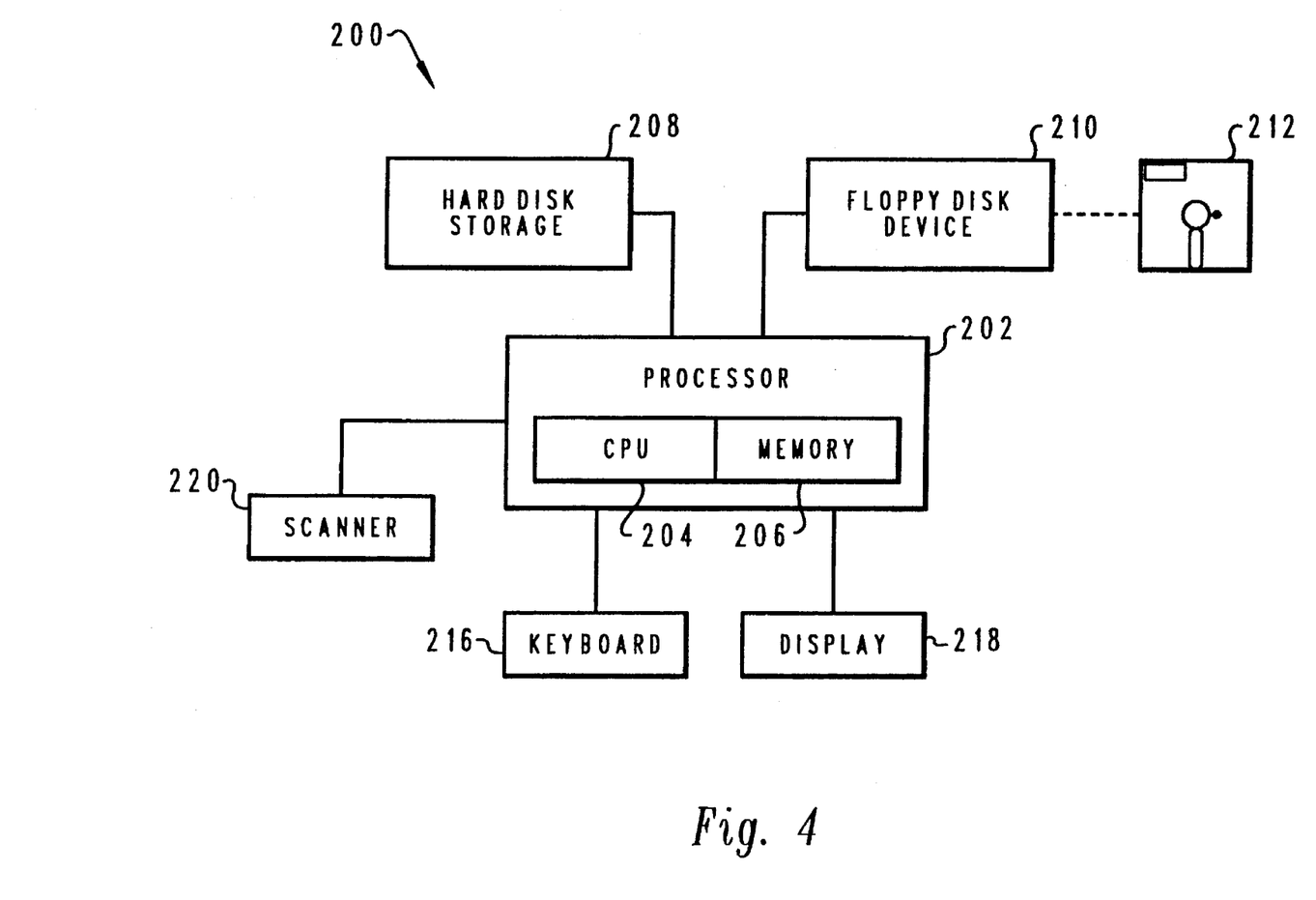
FIG. 4 shows an Optical Recognition System where operation of the present invention is carried out.

Turning now to FIG. 4, an Optical Character Recognition system 200 is shown where the operation of the present invention is carried out. The Optical Character Recognition system 200 consist of a processor 202 containing a CPU 204 and memory 206. Attached to the processor 202 is a scanner 220 for creating an output stream. In addition, a keyboard 216 is provided for entry of data by a user. Permanent storage is provided by hard disk storage 208 along with removable storage in the form of a floppy disk device 210. Program information or data may be inputted to the OCR system by a floppy disk 212 A display device 218 is also provided to permit a user to view information and data processing within the OCR system.

While the invention has been particularly shown and described with reference to preferred embodiments thereof, it will be understood by those skilled in the art that various changes in form and details may be made therein without departing from the spirit and scope of the invention.

What I claim is:

1. A method of recognizing unidentified characters appearing in an output text string in an optical character recognition system, comprising the computer implemented steps of:

a) for each unidentified character, producing a list of candidate characters associated with said unidentified character, said list being ordered from most likely to least likely;

b) grouping said unidentified characters into character match sets having equivalent lists of candidate characters;

c) ordering said character match sets according to number of candidate characters, from least to most;

d) whenever more than one character match sets have the same number of candidate characters, ordering said more than one character match sets according to number of word occurrences, from more to fewer;

e) whenever more than one of the character match sets ordered according to step d) have the same number of word occurrences, ordering said more than one character match sets ordered according to step d) according to word length, from longer to shorter;

f) sequentially from the unidentified characters ordered according to steps a) through e), substituting for each unidentified character its associated candidate characters to form possible words;

g) performing a spelling check for each possible word formed according to step f);

h) whenever step g) yields more than one correctly spelled words, saving said more than one correctly spelled words for further processing;

i) whenever step g) yields a single correctly spelled word, substituting the candidate character yielding said correctly spelled word for its associated unidentified character and substituting said candidate character yielding said correctly spelled word for an unidentified character of any word saved according to step h) having the same list of candidate characters.

* * * * *